(12) United States Patent
Lin

(10) Patent No.: US 7,403,288 B2
(45) Date of Patent: Jul. 22, 2008

(54) METHOD AND APPARATUS FOR MEASURING THICKNESS OF THIN ARTICLE

(75) Inventor: Jhy-Chain Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 286 days.

(21) Appl. No.: 11/283,294

(22) Filed: Nov. 18, 2005

(65) Prior Publication Data
US 2006/0132797 A1   Jun. 22, 2006

(30) Foreign Application Priority Data
Dec. 17, 2004  (TW) ................. 93139379 A

(51) Int. Cl.
*G01B 11/02* (2006.01)
*G01B 9/02* (2006.01)
(52) U.S. Cl. ....................... 356/503; 356/482
(58) Field of Classification Search ............ 356/503, 356/482
See application file for complete search history.

(56) References Cited

U.S. PATENT DOCUMENTS 5,351,124 A * 9/1994 Laskoskie et al. .......... 356/477
6,137,575 A    10/2000 Sugiyama et al.
6,837,109 B2    1/2005 Okuno
6,850,079 B2    2/2005 Yamada et al.
7,133,137 B2 * 11/2006 Shimmick .................. 356/497
2003/0090671 A1 *  5/2003 Takahashi et al. ........... 356/479
2005/0213103 A1 *  9/2005 Everett et al. ............... 356/479

OTHER PUBLICATIONS

Huang Jian-bui et al., "Review of Phase Generated Carrier Demodulation Techniques for Interferometric Fiber-optic Sensors", Optical Technique, May 2000, 228 to 231 and 234, vol. 26 No. 3, China.

* cited by examiner

*Primary Examiner*—Patrick Connolly
*Assistant Examiner*—Jonathan Skovholt

(57) ABSTRACT

An apparatus (100) for measuring a thickness of a thin article according to an embodiment of the present apparatus is provided. The apparatus includes an optical fiber interferometer (101), a signal processor module (102) and a measuring module (103). The optical fiber interferometer is configured for obtaining an optical distance difference. This optical distance difference is a result of the thickness of the thin article between a first optical path in which the thin article is measured and a second optical path. The signal processor module is configured for converting an optical distance difference into a phase difference and processing the optical distance difference to obtain a linear signal. That linear signal is convertible into a thickness value of the thin article.

12 Claims, 1 Drawing Sheet

METHOD AND APPARATUS FOR MEASURING THICKNESS OF THIN ARTICLE

BACKGROUD OF THE INVENTION

1. Field of the Invention

The present invention relates to a method and an apparatus for measuring a thickness of a thin article, and, particularly, to a method and an apparatus for measuring a thickness of a thin article via an optical interferometer.

2. Discussion of the Related Art

A conventional method for measuring a thickness of a thin article typically adopts a laser to illuminate the thin article. A thickness of the thin article is defined by an upper interface and a lower interface associated therewith. The laser has an original phase. When the laser illuminates the thin article, a first part of the laser is reflected by the upper interface and a second part of the laser is reflected by the lower interface of the thin article. The first part and the second part of the laser travel different distances, which causes a phase difference therebetween. A light sensor is therefore employed for detecting the phase difference. The thickness of the thin article is a function of the phase difference, and therefore, the thickness of the thin article can be obtained by calculating the function.

The upper interface of the thin article is exposed to the laser, and the reflection of the first part of the laser therefrom can be easily detected. However, intrinsic physical properties of the thin article, such as degree of transparency, surface roughness, internal defects, refractive index, optical diffusion, and optical dispersion often cause an unacceptable optical phase noise to the second part of the laser. Such optical phase noise makes it extremely difficult to extract eligible interfering signals for further calculation. In order to eliminate the optical phase noise, sophisticated and expansive instruments have to be employed.

Therefore, what is need in the art is a method and an apparatus for measuring the thickness of a thin sample that is accurate yet relatively inexpensive.

SUMMARY

An apparatus for measuring a thickness of a thin article (e.g., sample, element, film, or component) according to an embodiment of the present measuring apparatus is provided. The apparatus includes an optical fiber interferometer, a signal processor module, and a measuring module.

According to an embodiment of the apparatus, the foregoing optical fiber interferometer is configured for obtaining an optical distance difference caused by the thickness of the thin article between a first optical path in which the thin article can be measured and a second optical path. The optical fiber interferometer includes a laser light source, an optical coupler, a first optical fiber, and a second optical fiber. The laser light source is adapted for providing a laser light beam. The optical coupler is coupled to the laser light source and is adapted for splitting the laser light beam into a first light and a second light. The first optical fiber is coupled to the optical coupler for transmitting the first light. The second optical fiber is coupled to the optical coupler for transmitting the second light.

According to an embodiment of the apparatus, the foregoing signal processor module is configured for converting an optical distance difference into a phase difference signal and for processing the phase difference signal to thereby obtain a linear signal. That linear signal can be converted into a value of the thickness of the thin article. The signal processor module includes a sine wave signal generator, an electro-optical (E-O) phase modulator, an optical detector, and a signal processor. The sine wave signal generator is adapted for generating a sine wave signal. The E-O phase modulator is coupled between one of the first optical fiber and the second optical fiber, while it is also coupled to the sine wave signal generator. As such, the E-O phase modulator is configured for adding a sine wave signal to a light to modulate a phase of the light transmitting therethrough. The optical detector is coupled to the optical coupler. The optical detector is specifically configured for receiving a light output from the optical coupler and for converting an optical signal into an electric signal. The signal processor is coupled to the optical detector and is configured for receiving the electric signal and thereafter processing the electric signal to obtain a linear signal, a signal convertible to a thickness value of the thin article being measured.

An advantage of the apparatus for measuring a thickness of a thin article is that it is simpler in structure than conventional apparatuses are.

Another advantage of the apparatus for measuring a thickness of a thin article is that it can measure a thickness thereof without considering intrinsic physical properties of the thin article, such as transparency, surface roughness, internal defects, refractive index, optical diffusion and optical dispersion.

A further advantage of the apparatus for measuring a thickness of a thin article is that it can obtain a linear signal readily convertible to a thickness value.

A still further advantage of the apparatus for measuring a thickness of a thin article is that it can measure a thickness thereof without touching the object or element, thus avoiding unintentional damage or contamination.

Other advantages and novel features will become more apparent from the following detailed description when taken in conjunction with the accompanying drawings.

BRIEF DESCRIPTION OF THE DRAWINGS

Many aspects of the present method and apparatus for measuring a thickness of a thin article can be better understood with reference to the following drawing. The components in the drawing are not necessarily to scale, the emphasis instead being placed upon clearly illustrating the principles of the present method and apparatus.

Figure 1:
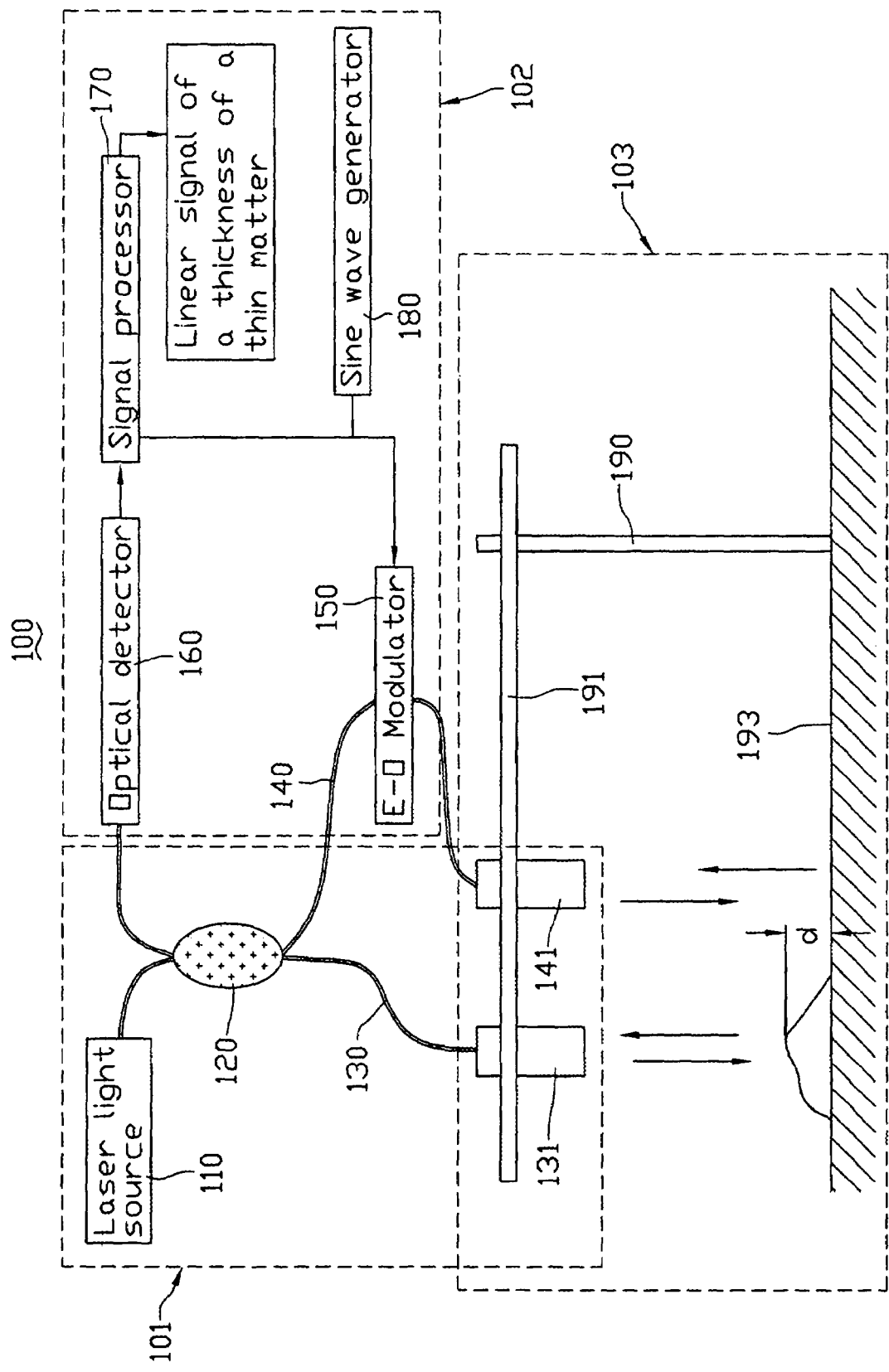
FIG. 1 is a schematic diagram of an apparatus for measuring a thickness of a thin article, according to a preferred embodiment of the present measuring apparatus.

The exemplifications set out herein illustrate at least one preferred embodiment of the present measuring apparatus and method, in one form, and such exemplifications are not to be construed as limiting the scope of the apparatus and/or method in any manner.

DETAILED DESCRIPTION OF THE PREFERRED EMBODIMENTS

FIG. 1 illustrates an apparatus 100 for measuring a thickness of a thin article, especially a thin film, according to a preferred embodiment of the present apparatus. The apparatus 100 includes an optical fiber interferometer 101, a signal processor module 102, and a measuring module 103.

The optical fiber interferometer 101 includes a laser light source 110, an optical coupler 120, a first optical fiber 130, and a second optical fiber 140. The optical coupler 120 is advantageously an X-type fiber coupler. The laser light source 110 is coupled to the optical coupler 120 and is adapted/configured for providing light to the optical coupler 120. The optical coupler 120 is adapted for splitting the light into fist light and second light and for outputting the first light and the second light, respectively, to the first optical fiber 130 and the second optical fiber 140. The first optical fiber 130 is coupled to the optical coupler 120 and is adapted for transmitting the first light. The second optical fiber 140 is coupled to the optical coupler 120 and is adapted for transmitting the second light.

The optical fiber interferometer 101 may further include a first optical collimator 131 and a second optical collimator 141. The first optical collimator 131 is coupled with the first optical fiber 130 and is configured for collimating the first light. The second optical collimator 141 is coupled with the second optical fiber 140 and is configured for collimating the second light.

The signal processor module 102 includes an electrooptical (E-O) phase modulator 150, an optical detector 160, a signal processor 170, and a sine wave signal generator 180. The sine wave signal generator 180 is adapted for generating a sine wave signal. The E-O phase modulator 150 is coupled to the sine wave signal generator 180, for adding the sine wave signal into the light thereby modulating the phase of the light.

The optical detector 160 is coupled to the optical coupler 120 for receiving the light outputting therefrom and converting an optical interfering signal containing information, i.e. the thickness of the thin article into an electronic signal. The signal processor 170 is coupled to the optical detector 160 for receiving the electronic signal and thereafter processing the received electronic signal thereby obtaining a linear signal of the thickness of the thin article.

The measuring module 103 includes a reference plane 193, an adjustable plate 191. The first optical collimator 131 and the second optical collimator 141 are mounted on the adjustable plate 191. The measuring module 103 may further include a supporter 190 mechanically engaged with the adjustable plate 191.

In operation, the laser light source 110 provides a light beam to the optical coupler 120. The optical coupler 120 splits the light beam into a first light and a second light, which are coherent in phase and frequency. The first light is transmitted along the first optical fiber 130 to the first optical collimator 131, and the second light is transmitted along the second optical fiber 140 to the second optical collimator 141. The first optical collimator 131 and the second collimator 141 respectively collimate the first light and the second light. Thereafter, the first light and the second light respectively perpendicularly illuminate a top surface of the thin article and the reference plane 193 and are respectively reflected back to the first optical collimator 131 and the second optical collimator 141. Then, the first light and the second light are respectively transmitted back to the optical coupler 120 and interfere thereat thereby produce an optical interfering signal.

The optical interfering signal is detected by the optical detector 160 and is converted into an electric signal including information about phases of the first light and the second light before the interfering. The electronic signals are received and then processed by the signal processor 170. Therefore, by adjusting the adjustable supporter 191, first light and second light before interfering, which are coherent in phase, are obtained. In other words, the adjustment of the adjustable supporter 191 eliminates the phase difference between the first light and the second light caused by the optical path difference led in by the measuring device. In another exemplary embodiment, the E-O phase modulator 150 could be used independently or accompanying with the adjustable supporter 191 to modulate the first light and the second light so as to be coherent in phase.

The thin article is settled on the reference plane 193, such that the first light can illuminate the thin article. Therefore, a thickness d of the thin article causes an optical path difference of 2nd between the first light and the second light, wherein n is the refractive index of air. Since n is approximately equal to 1, the optical path difference is also approximately equal to 2 d. Therefore, there occurs a phase difference of 2 kd between the first light and the second light, wherein k is the wave number of the first light and the second light. After the first light and the second light interfered at the optical coupler 120, an optical interfering signal A(1+B cos 2 kd) is obtained thereby.

Then the sine wave signal generator 180 drives the E-O phase modulator 150 to add an optical phase difference sin ωt to the second optical fiber 140. Consequently, the optical interfering signal becomes A*(1+B cos(sin ωt+2 kd)). The optical detector 160 then detects the modulated optical interfering signal and transfers the modulated optical interfering signal into an electrical signal.

A formula of the electrical signal after being Fourier expanded includes a direct current term, a ω frequency term, a 2ω frequency term and a plurality of terms of higher orders, wherein the ω frequency term is equal to C*sin(2nd), and the 2ω frequency term is equal to C*cos(2nd), wherein C is a constant related to the interfering light intensity. The signal processor 170 further includes a ω frequency filter circuit (not shown) and a 2ω frequency filter circuit (not shown) configured for filtering and obtaining electrical signals, respectively, in direct ratio to sin(2nd) and cos(2nd), respectively, corresponding to the ω frequency term and the 2ω frequency term. The signal processor module 102 further includes a comparative amplifier (not shown) configured for comparing the values of ω frequency term with the 2ω frequency term and obtaining a tangent value of 2nd. Generally, the value of 2nd is very small; therefore, tan(2nd) can be approximated as 2nd. Consequently, a linear value of the thickness d of the thin article is thus obtained.

The present invention also provides a method for measuring a thickness d of a thin article. The method includes a series of steps. A laser beam to an optical coupler 120 is provided to an optical coupler 120 and the optical coupler 120 splits the laser beam into a first light and a second light, wherein the first light and the second light are coherent in phase. A first optical fiber 130 transmits the first light to a first optical collimator 131, and a second optical fiber 140 transmits the second light to a second optical collimator 141. The first light and the second light then are collimated by a first optical collimator 131 and a second optical collimator 141, respectively, and, thereafter, perpendicularly illuminate a reference plane 193. The first optical collimator 131 and the second optical collimator 141 then, respectively, receive the reflected first light and second light. The first optical fiber 130 and the second optical fiber 140 then respectively transmit the reflected first and second light back to the optical coupler 120. The first light and the second light interfere with each other, thereby forming an optical interference signal, wherein the optical interfering signal contains information about a phase difference caused by a transmitting optical path difference between the first light and the second light.

An optical detector 160 detects the optical interfering signal and converts the optical interfering signal into an electrical signal. Then, the foregoing first light and/or second light are modulated to be coherent in phase, wherein the method for modulating can be regulating an adjustable supporter 190 and/or the positions of the first optical collimator 131 and/or the second optical collimator 141 secured thereon. Advantageously, the adjustment is made by modulating by a given E-O phase modulator 150 coupled with the optical coupler 120.

Then a thin article is set on the reference plane 193, where it can be illuminated by the first light. An optical detector 160 then detects an optical interference signal containing information of a phase difference between the first light and the second light. Such a phase difference is caused by a change of the optical path difference induced by the presence of the thin article. A sine wave signal generator 180, coupled to the E-O phase modulator 150, drives the E-O phase modulator 150 to add an optical phase difference $\sin \omega t$ to one of the first light and the second light to produce a modulated optical interference signal. Therefore, the optical detector 160 detects the modulated optical interference signal and converts the modulated optical interference signal into an electrical signal. Then, a signal processor 170 processes the electrical signal to obtain a linear value of the thickness d of the thin article.

According to an aspect of the foregoing method, a formula of the electrical signal, after being Fourier expanded, includes a direct current term, a $\omega$ frequency term, a $2\omega$ frequency term and a plurality of terms of higher orders, wherein the $\omega$ frequency term is equal to $C*\sin(2nd)$, and the $2\omega$ frequency term is equal to $C*\cos(2nd)$, wherein C is a constant related to the interfering light intensity The step in which the signal processor 170 processes the electrical signal further includes the sub-steps of: 1) a $\omega$ frequency filter circuit (not shown) and a $2\omega$ frequency filter circuit (not shown), respectively, of the signal processor 170 filtering and obtaining electrical signals in direct ratio to $\sin(2nd)$ and $\cos(2nd)$ corresponding, respectively, to the $\omega$ frequency term and the $2\omega$ frequency term; 2) a comparative amplifier (not shown) of the signal processor 170 comparing the values of the $\omega$ frequency term with the $2\omega$ frequency term and obtaining a tangent value of 2nd, which can be approximated as 2d in the case that the value of nd is very small, wherein n is the refractive index of air and is approximately to be 1; and 3) consequently obtaining a linear value of the thickness d of the thin article.

It is to be understood that a configuration in which the E-O optical modulator 150 is disposed within the first optical fiber is also considered to be within the spirit of the present measurement system.

It is to be further understood that the above-described embodiments illustrate the scope of the invention but do not restrict the scope of the invention. Variations may be made to the embodiments without departing from the spirit or scope of the invention as claimed herein.

What is claimed is:

1. An apparatus for measuring a thickness of a thin article comprising:
   an optical fiber interferometer, the optical fiber interferometer being configured for obtaining an optical distance difference caused by the thickness of the thin article, the optical distance difference between a first optical path in which the thin article is measured and a second optical path, the optical fiber interferometer comprising:
      a laser light source adapted for providing a light beam to the optical coupler;
      an optical coupler configured for splitting the light beam into a first light and a second light;
      a first optical fiber coupled to the optical coupler, the first optical fiber being configured for transmitting the first light; and
      a second optical fiber coupled to the optical coupler, the first optical fiber being configured for transmitting the second light;
      a first optical collimator coupled with the first optical fiber, the first optical collimator being configured for collimating the first light;
      a second optical collimator coupled with the second optical fiber, the second optical collimator being configured for collimating the second light;
      a signal processor module configured for detecting the optical distance difference, and for processing the optical distance difference to obtain a linear signal, the linear signal being convertible into a thickness value of the thin article; and
      a measuring module including a reference plane and an adjustable plane on which the first optical collimator and the second optical collimator are settled, the thin article begin arranged on the reference place, and the adjustable plane being configured for modulating the first light and the second light to be coherent in phase.

2. The apparatus as described in claim 1, wherein the signal processor module comprises:
   a sine wave signal generator configured for generating a sine wave signal;
   an electro-optical (E-O) phase modulator coupled between one of the first optical fiber and the second optical fiber, the electro-optical (E-O) phase modulator also being coupled to the sine wave signal generator, the electro-optical (E-O) phase modulator being configured for adding a sine wave signal to one of the first light and the second light to produce an optical interference signal in the optical coupler, the optical interference signal containing information related to the optical difference;
   an optical detector coupled to the optical coupler, the optical detector being configured for receiving the optical interference signal output from the optical coupler, the optical detector being further configured for detecting the optical distance difference and converting the optical interference signal into an electric signal; and
   a signal processor coupled to the optical detector, the signal processor being configured for receiving the electric signal and thereafter processing the electric signal to obtain the linear signal, the liner signal being convertible to a thickness value of the thin article.

3. The apparatus as described in claim 1, wherein the measuring module further comprises a supporter configured for securing the adjustable plane.

4. A method for measuring a thickness of a thin article, comprising:
   preparing a first optical path and a second optical path, the first optical path and the second optical path being coupled to each other at a certain point, both the first optical path and the second optical path ending at the certain point;
   providing a first light and a second light, respectively, transmitting in the first optical path and the second optical path, the first light and the second light interfering at the certain point;
   modulating at least one of the first light and the second light for making the first light and the second light coherent in phase by an adjustable plane;
   settling the thin article into the first optical path in order to change an optical distance that the first light is traveled in the first optical path, a phase difference being created between the first light and the second light;
   at least one of modulating and changing at least one phase of the first light and the second light to obtain an optical interference signal, the optical interference signal containing an information of a thickness value of the thin article; and processing the optical interference signal to obtain a linear value of the thickness of the thin article.

5. The method for measuring a thickness of a thin article as described in claim 4, wherein the step of at least one of modulating and changing at least one of phase of the first light and the second light comprises adding a phase modulating signal to at least one of the first light and the second light, the phase modulating signal being configured for modulating the optical interference signal.

6. The method for measuring a thickness of a thin article as described in claim 4, wherein the step of at least one of modulating and changing at least one of phase of the first light and the second light comprises adjusting at least one of the optical distance of the first optical path and the second optical path.

7. The method for measuring a thickness of a thin article as described in claim 4, wherein the step of providing a first light and a second light, respectively, transmitting in the first optical path and the second optical path comprises;

providing a laser light beam; and using an optical splitter to split the laser light beam into a first light and a second light and to transmit the first light and the second light, respectively, in the first optical path and the second optical path.

8. The method for measuring a thickness of a thin article as described in claim 7, wherein the optical splitter is a X-type optical coupler.

9. The method for measuring a thickness of a thin article as described in claim 4, wherein the first optical path has at least one section of open optical path, the thin article being insertable therein.

10. The method for measuring a thickness of a thin article as described in claim 4, wherein the step of processing the optical interference signal to obtain the liner value of the thickness of the thin article comprises:

converting the optical interference signal into an electric signal using a Fourier expanding expression having a w frequency term and a $2\omega$ frequency term; and processing the electric signal to a linear signal, the linear signal being convertible to the thickness value of the thin article.

11. The method for measuring a thickness of a thin article as described in claim 10, wherein the method for processing the electric signal to a liner signal comprises:

filtering the electric signal to obtain a $\omega$ frequency term and a $2\omega$ frequency term from the electric signal; and comparing the $\omega$ frequency term and the $2\omega$ frequency term to obtain the linear value of the thickness of the thin article.

12. The method for measuring a thickness of a thin article as described in claim 4, wherein the first light is reflected at least once in the at least one section of open optical path.

* * * * *